Nov. 4, 1930.  W. C. HUEBNER  1,780,191
APPARATUS FOR MAKING PHOTOGRAPHIC FRACTIONAL EXPOSURES
Filed May 28, 1928  4 Sheets-Sheet 2
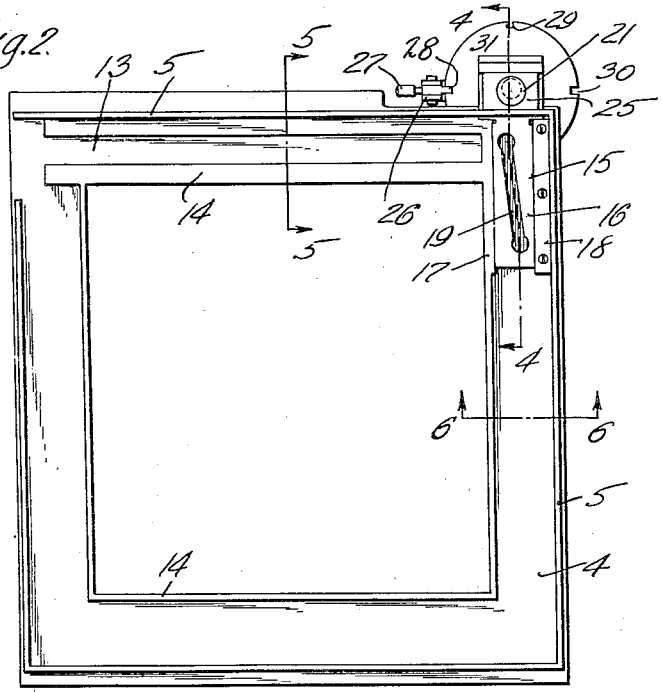
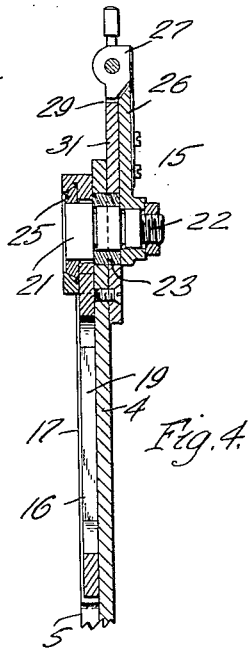
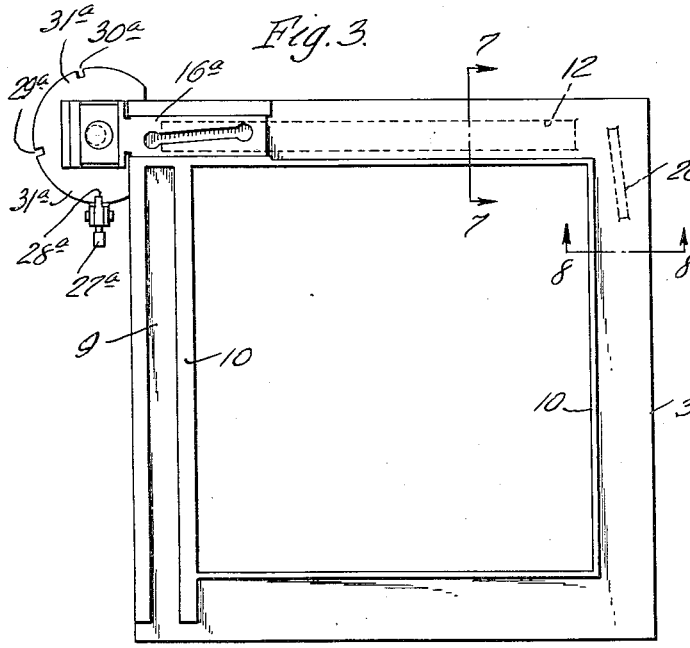
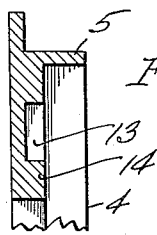
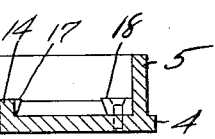
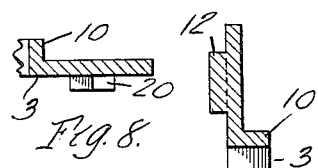
INVENTOR.
William C. Huebner
By Parker Rockwood
ATTORNEYS.

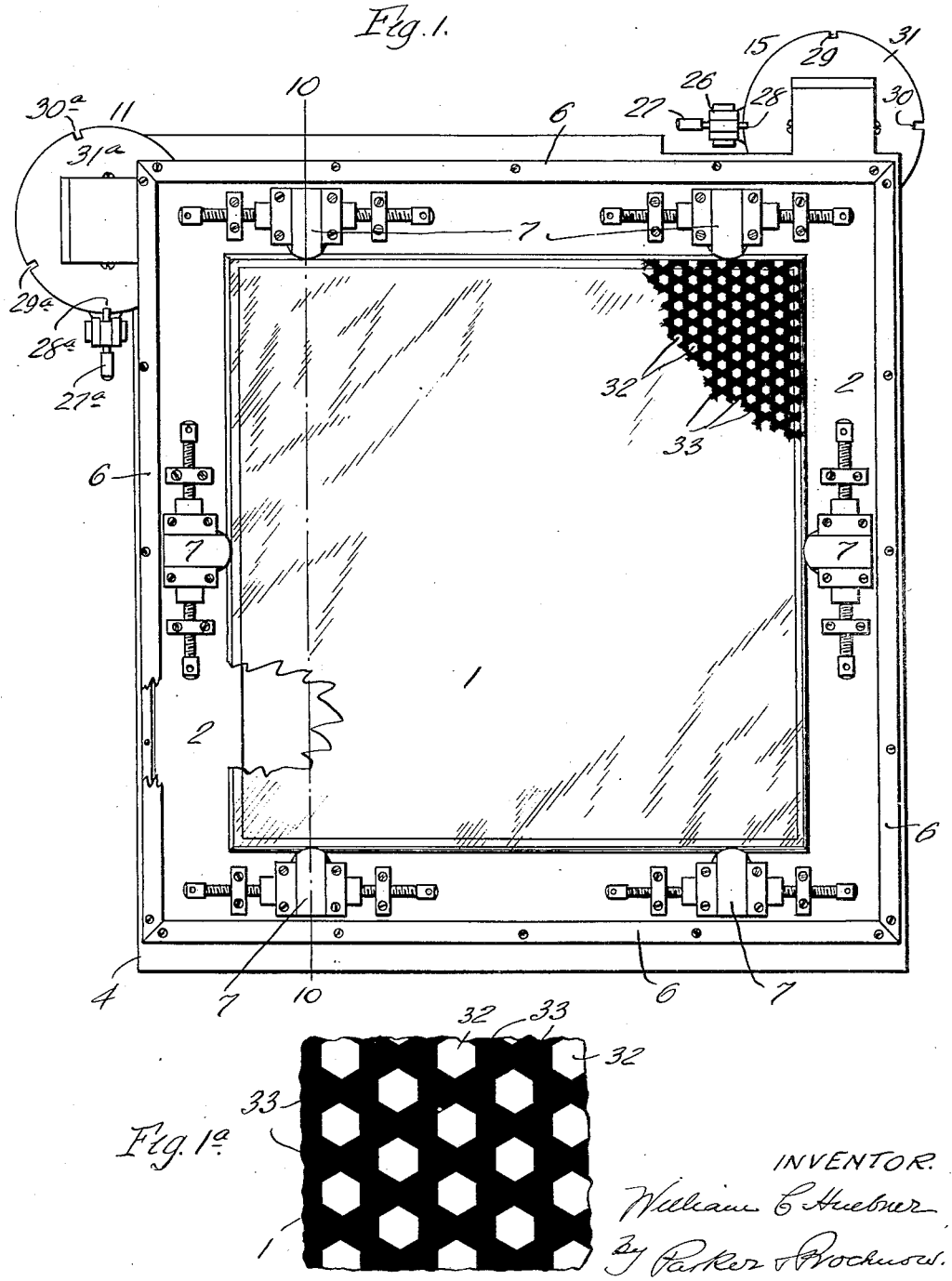

Nov. 4, 1930.    W. C. HUEBNER    1,780,191
APPARATUS FOR MAKING PHOTOGRAPHIC FRACTIONAL EXPOSURES
Filed May 28, 1928    4 Sheets-Sheet 3
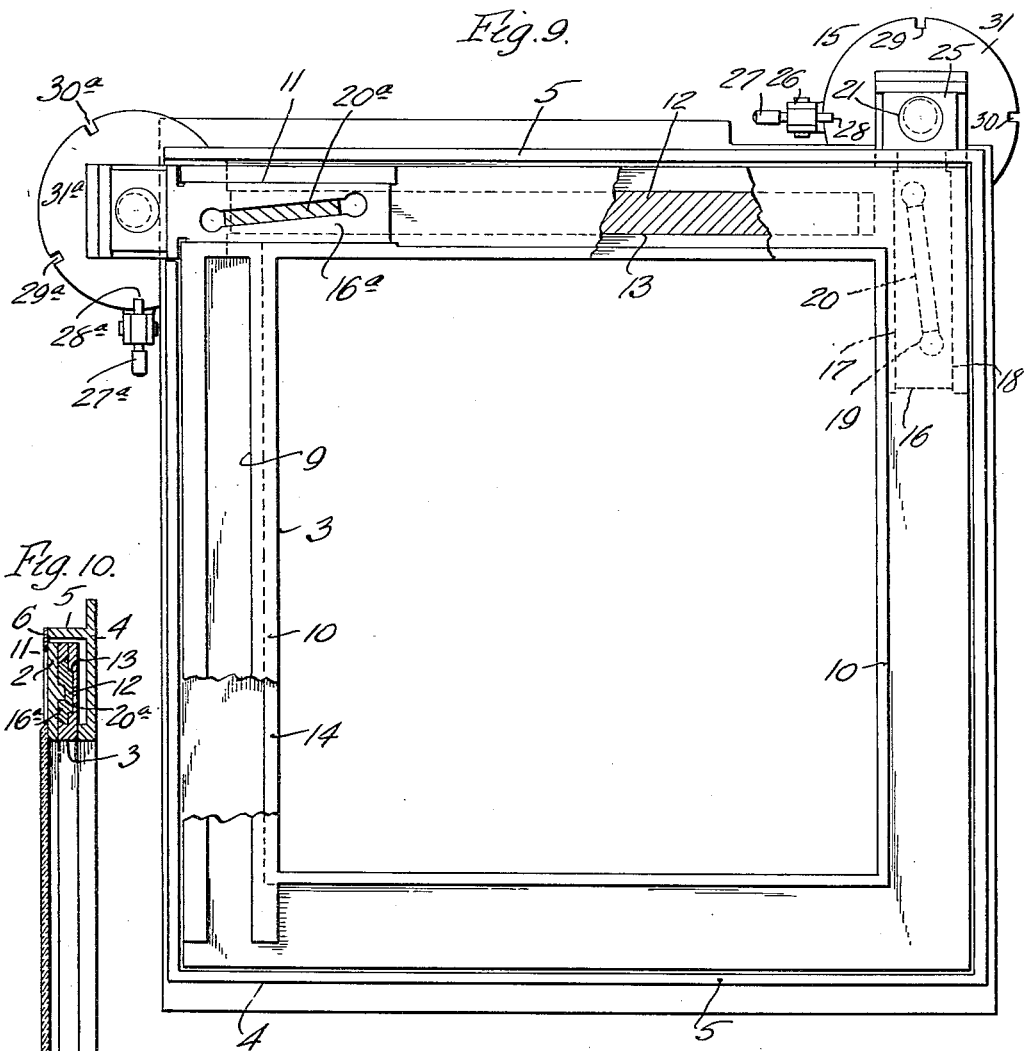
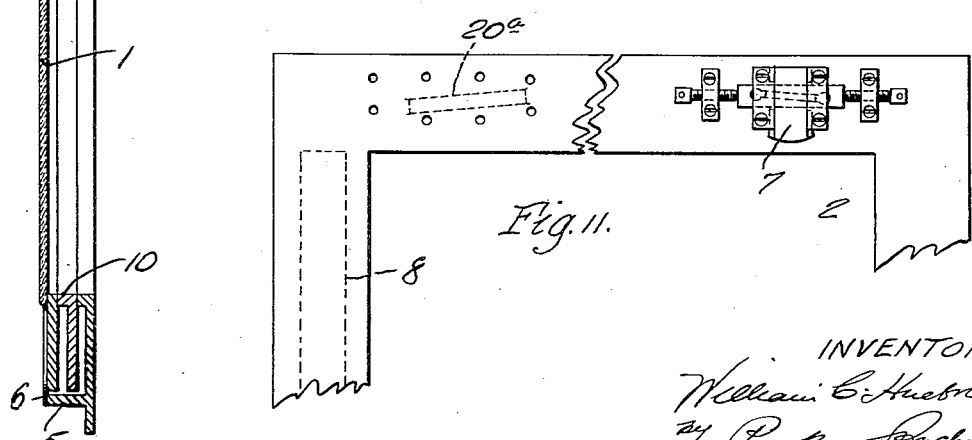
INVENTOR.
William C. Huebner
By Parker & Brochard
ATTORNEYS.

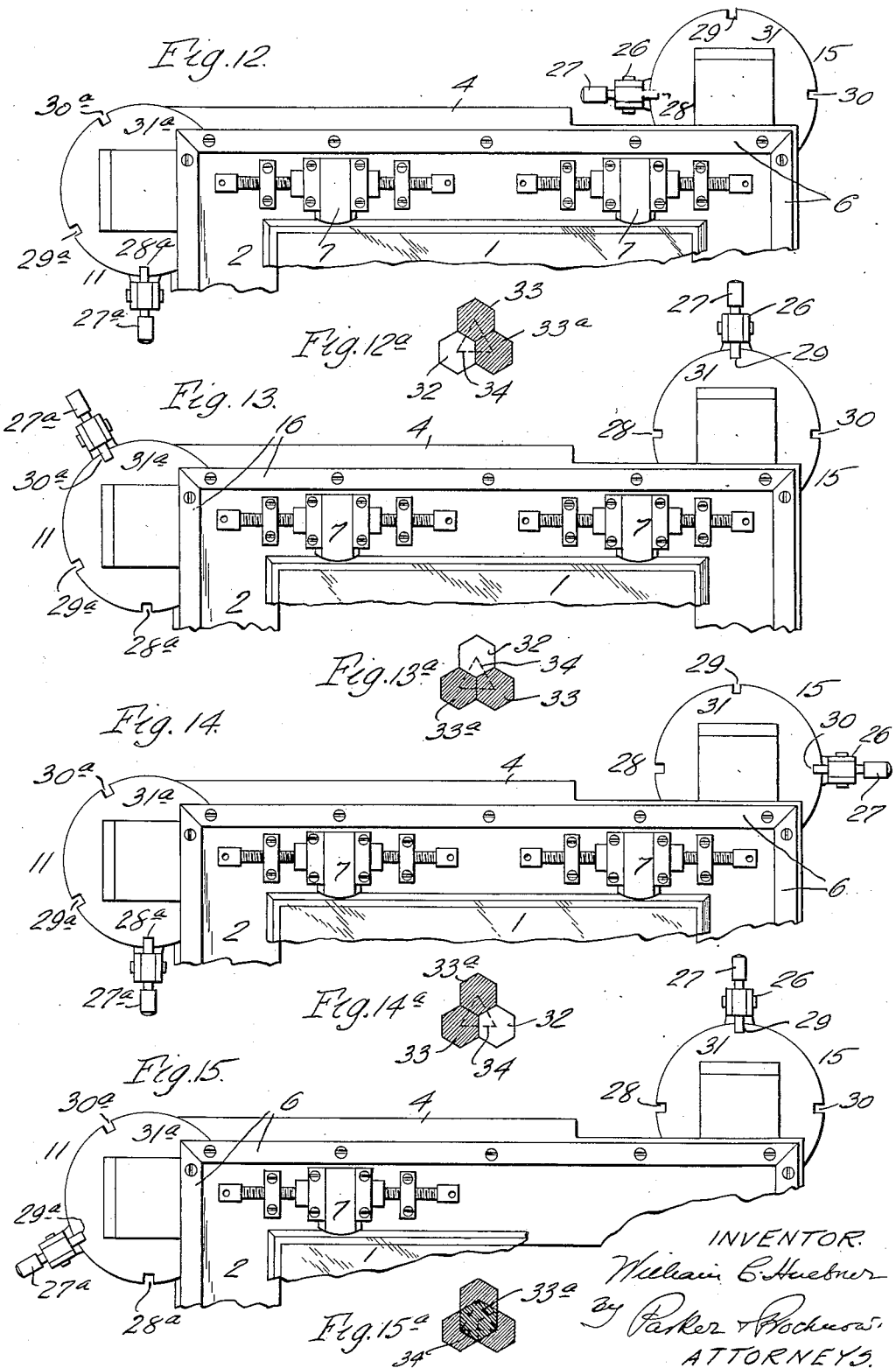

Patented Nov. 4, 1930

1,780,191

UNITED STATES PATENT OFFICE

WILLIAM C. HUEBNER, OF CHICAGO, ILLINOIS

APPARATUS FOR MAKING PHOTOGRAPHIC FRACTIONAL EXPOSURES

Application filed May 28, 1928. Serial No. 281,185.

This invention relates to improvements in apparatus for making photographic fractional exposures.

One object of the invention is to provide a simple, relatively inexpensive, rugged holder for fractograph screen, color filter, or negative, as the case may be, and so arranged that the sections composing the same may be relatively shifted in a predetermined manner, so as to obtain predetermined fractional exposures of a subject or image upon the sensitized plate or surface.

Another object of the invention is to provide an improved fractional screen having transparent and opaque units of such shape and grouping that the same may be coordinated with a holder of the type indicated in the preceding paragraph, in obtaining fractional exposures of predetermined areas of the image or subject in a predetermined sequence, the screen and holder being so manipulated that an opaque unit may be shifted to occupy the same position as a transparent unit in a previous exposure and, vice versa.

A further object of the invention is to provide an apparatus of the character indicated, which may be readily adjusted to the predetermined desired positions and these positions automatically determined by engagement of operating parts, in such manner that the adjustments may be carried on in total darkness, as in an exposure room for high speed sensitive plates, to the end that the operations or adjustments may be effected in the most expeditious manner.

Other objects of the invention will more clearly appear from the description and claims hereinafter following.

In the accompanying drawings, illustrating a preferred embodiment of the invention, Fig. 1 is a front elevation of the improved holder with a fractograph screen therein; Fig. 1ª is a face view of a portion of the screen greatly enlarged; Fig. 2 is a face view of the base member of the holder; Fig. 3 is a similar view of the intermediate member thereof.

Fig. 4 is a vertical, transverse section of the base member on line 4—4, Fig. 2, on an enlarged scale.

Figs. 5 and 6 are a vertical and a horizontal section thereof on lines 5—5 and 6—6 respectively, of Fig. 2.

Figs. 7 and 8 are similar views of the intermediate member on lines 7—7 and 8—8 respectively of Fig. 3.

Fig. 9 is a front elevation of the base member and the intermediate member in assembled relation.

Fig. 10 is a transverse section of the holder and screen, approximately on line 10—10, Fig. 1, the securing devices for the screen being omitted.

Fig. 11 is a fragmentary, front elevation of the top or screen-supporting member of the holder.

Figs. 12–15 are fragmentary, front elevations of the holder, showing the different successive positions of the adjusting or manipulating means for shifting the screen.

Figs. 12ª to 15ª are diagrammatic figures showing a single group of the screen elements in positions corresponding to the respective adjustments of Figs. 12 to 15.

In the embodiment of the invention illustrated, the screen 1 is mounted in a holder or support which permits an angular adjustment of the screen in two directions. As clear from Figures 1 and 10, the outer or active surface of the screen plate 1 is disposed in a plane above any point or portion of the combination holder, hereinafter described, so that the outer or active surface of the screen may be placed in direct contact and under pressure with the surface on which the exposure is to be made.

The support preferably comprises three frame members, an upper screen-receiving member 2, an intermediate member 3 on which the screen-receiving member 2 is supported and on which it is adjustable in one direction, and a base frame or member 4 on which the intermediate screen member 3 is in turn supported and on which it is adjustable in a direction at an angle to the direction of adjustment of the screen-receiving member. For the purpose of description, these members may be referred to respectively as the screen frame, the intermediate frame and the base frame, and they all comprise rectangular frames having a central opening therein. The three frames, however, when assembled comprise a single holder for supporting the screen, and which permits of its adjustment in two directions.

The screen frame 2 and the intermediate frame 3 are assembled one on top of the other on the base frame 4 and within a flange 5 formed at the outer edge of this base frame, the screen frame and intermediate frame being sufficiently small to provide for a clearance between their edges and the flange so that each may have a limited movement, one in a vertical direction and the other in a lateral direction. It will be understood that the terms "vertical" and "lateral" as applied to the movement of the respective screen and intermediate frames are merely relative and are used for convenience, being applied to the movement of the different frame members in the position in which they are arranged in the drawings. After the three frames have been assembled one on top of the other, suitable holding strips 6 are secured to the top of the flange 5 and overlap and engage the edges of the screen frame 2 and maintain the respective frame members in their assembled relation.

On the front face of the screen frame 2 there are provided suitable clamps 7 which are adjustable towards and from the edges of the screen 1 and are adapted to engage over said edges for holding the screen in position, the adjustment of the clamps permitting the screen to be placed in its proper relative position on the screen frame.

For the purpose of insuring accuracy and preventing lateral movement of the screen frame 2 with respect to the intermediate frame 3, there is provided on the rear face of the screen frame 2 a longitudinally extending guide rib 8 which fits into a corresponding recess 9 on the front face of the intermediate frame 3. This guide rib permits of a longitudinal movement of the screen frame but prevents a lateral relative movement between the two frames. The intermediate frame is provided with an inner peripheral flange 10 against which the screen frame rests and which spaces the adjacent faces of the frame apart to accommodate the mechanism 11 which is provided for adjusting the screen frame relatively to the intermediate frame.

A similar guide rib 12 at right angles, however, to the guide rib 8 is provided on the rear face of the intermediate frame 3 and which fits within a recess or channel 13 formed on the front face of the base frame 4. This base frame on its front face is provided with a rib 14 against which the rear face of the intermediate frame rests and which spaces the adjacent faces of the intermediate and base frames apart from the front to accommodate the adjusting mechanism 15 for the intermediate frame. It will be thus seen that by moving the intermediate frame laterally on the base frame and the screen frame vertically on the intermediate frame, a movement in two directions is imparted to the screen 1 carried on the screen frame.

The adjusting mechanisms 11 and 15 are provided for moving the screen frame and the intermediate frame respectively and are of substantially the same construction. The directions of movement, however, imparted by the respective mechanisms are at right angles. These adjusting mechanisms permit of a very fine adjustment and movement of the parts, and as the two mechanisms are exactly alike in construction, a description of the mechanism 15 only will be necessary.

Referring to Fig. 4, there is mounted on the front face of the base frame 4 a slide block 16 which is arranged to slide vertically between two opposite guide ribs 17 and 18, the overhanging bevelled edges of which ribs engage over the bevelled edges of the slide block 16 to maintain the block in its assembled position. One of the ribs 18 is preferably made removable for ease in assembly. The block 16 on its front face is provided with a diagonally extending slot 19 which is adapted to receive a correspondingly extending lug 20 arranged on the rear face of the intermediate frame 3, so that when the block is slid longitudinally in its guideway, a transverse or lateral movement will be imparted to the intermediate frame. For imparting a vertical sliding movement to this block 18, there is provided an eccentric or cam 21 formed on the end of a stub shaft 22 journalled in a bushing 23 secured on a portion of the base frame 4. This eccentric or cam 21 operates in a head 25 mounted on the upper end of the block 16 arranged to have a slight transverse movement thereon. The stub shaft 22 is rotated by means of an arm 26 fixed to the rear end thereof and which is provided with a spring influenced latch handle 27. This latch handle is adapted to engage in any selected one of a series of spaced notches 28 and 29 and 30 formed and disposed in predetermined positions on the periphery of a stationary indicator plate 31 fixed on the base frame 4. These notches are so positioned that when the latch handle 17 is engaged in the respective notches the screen will assume definite, vertical, predetermined positions on the frame and with respect to the stationary subject and sensitized plate between which the screen is arranged.

The structure of the adjusting mechanism 11, as heretofore stated, is substantially the same as that of the adjusting mechanism 15. The cam block 16ª of this adjusting mechanism is mounted on the intermediate frame at right angles to the cam block 16 and is adapted to receive a cam lug 20ᵃ on the rear face of the screen frame 2 so that a movement of the cam block 16ᵃ will impart vertical movement to the screen frame 2. This cam block is operated by a suitable latch handle 27ᵃ which is adapted to engage in the respective spaced notches 28ᵃ, 29ᵃ and 30ᵃ on the indicator plate 31ᵃ, these notches being so related with respect to the different positions of the screen that when the handles 27ᵃ engages in the respective notches the screen will assume definite or predetermined vertical positions with respect to the sensitized plate in front of which it is supported.

One type of screen to be used in connection with the above described holder is illustrated in the accompanying drawings and has its area composed of minute, transparent and opaque units which are arranged in groups. These groups each contain one or more transparent units and a greater or less number of opaque units. The particular screen illustrated has hexagonal, transparent units 32 and opaque units 33, of which one transparent unit 32 and two opaque units 33 and 33ᵃ constitute a group, being disposed about a common center in such a manner that their centers coincide with the apices of an equilateral triangle 34. In order to more fully understand the predetermined positions to which the screen 1 may be moved, reference is had to Figs. 12 to 15 and 12ᵃ to 15ᵃ which show the positions of the positioning handles 27 and 27ᵃ and the relative positions of the transparent and opaque units of a single group in the different adjustments for which the screen is constructed.

Referring first to Fig. 12, the lateral adjusting handle 27 is in a position where it engages the notch 28 of the plate 31, and the vertical adjusting handle 27ᵃ engages the notch 28ᵃ of the other plate 31ᵃ. After a suitable exposure has been made through the screen in this position, the screen is then moved vertically and also laterally to the left to locate the unit 32 in the position illustrated in Fig. 13ᵃ which will likewise locate the units 33 and 33ᵃ in the position illustrated in Fig. 13ᵃ. This position is accomplished by moving the lateral adjusting handle 27 to the notch 29 and the vertical adjusting handle 27ᵃ to the notch 30ᵃ. This movement of the handles, it will be seen, moves the screen to the limit of its upward movement and about half the distance of its lateral movement to the right, and the screen thus being moved so that a second portion of the area of the sensitized plate will be exposed through the transparent area of the screen.

The third position of the screen is illustrated in Fig. 14ᵃ, wherein the screen has been moved to the limit of its downward and lateral adjustment so that the transparent unit 32 and the opaque units 33 and 33ᵃ occupy the respective positions illustrated in Fig. 14ᵃ. To move the screen to this position, the handle 27 is moved to the notch 30 which shifts the screen to a limit of its lateral movement, and the handle 27ᵃ is moved back to the notch 28ᵃ which will shift the screen to its lowest vertical adjustment. It will be seen that in all three positions the centers of the group formed by the transparent unit 32 and the two transparent units 33 and 33ᵃ will coincide with the apices of an equilateral triangle 34, the sides of which extend from the respective centers of the three units of the group, and that by the movement of the screen to each of the three positions, one-third of the area of the sensitized plate will have been exposed through the transparent area of the screen at each exposure. Therefore, the several exposures through the screen in its several successive positions cover the entire area of the sensitized surface except insofar as the exposed points are separated from each other by reason of the distance between the screen and the sensitized surface or according to the opening of the lens diaphragm of the camera. If the screen were in actual contact with the sensitized surface it would expose in each position one-third of the sensitized surface. The several exposures produce on the sensitized surface printing points which are separated more or less, and each exposure can be separately or differently timed, as may be desired, and the operation can be completed with the screen in either of the exposing positions, as may be deemed desirable. Also, more than one exposure may be made through the screen in any of the aforesaid positions.

In addition to the three definite positions above described, means are provided for effecting a fourth adjustment of the screen, wherein the center of any one of the units of the group may be caused to coincide with the center of the triangle 34, as illustrated in Figs. 15 and 15ᵃ. In this position, as shown in Fig. 15ᵃ, the center of the opaque unit 33ᵃ is moved to coincide with the center of the equilateral triangle 34. In order to establish this position, the lateral adjusting handle 27 is moved to the notch 29, which shifts the screen laterally to a point intermediate of the limits of its lateral adjustments, and the vertical adjusting handle 27ᵃ moved to the notch 29ᵃ, thus shifting the screen to a point intermediate of the limits of its vertical adjustments. In this manner, an opaque unit is disposed on the center of the equilateral triangle, or of the group, and as a result, a different area equal to one-third of the area, however, of the entire plate, will be exposed through the opaque units of the screen. A tone value of finer or different quality is thus imparted to the negative.

With the arrangement hereinbefore described, it will be observed that the relative shifts of the screen to each desired position, are obtained with exactness and greatest convenience, and such shifts may be effected even in total darkness, as frequently desirable, since the latches will automatically engage in the respective notches for the several predetermined positions.

By employing the particular forms of opaque and transparent units on the screen disclosed, and the particular rectilinear movements of the holder sections described, successive fractional contact exposures may be so made that they join each other exactly to cover the entire surface of the sensitized plate or other surface and without leaving any gaps or vacant spaces. In the case of such contact exposures, two-thirds of the surface will be opaque and one-third transparent. When a projection exposure is to be made, that is, with the screen spaced from the negative or sensitized surface, the proportion of opaque and transparent portions will be reversed so that only one-third of the screen will be opaque and two-thirds transparent, thus producing a half tone effect on the negative. The remaining negatives of the series will be similarly made but with the screen shifted each time so as to bring the dots in the apices of a triangle.

I have herein shown and described with particularity, one specific form of holder and fractional or fractograph screen peculiarly cooperable therewith, but I am aware that the holder may be utilized with corresponding functions and results with color filters or by placing the sensitized negative or plate directly on the holder and shifting it with respect to the subject or image. Likewise, a series of negatives may be used on the improved holder, each being exposed in a different position relative to the image or subject, thus obtaining the desired fractional exposure results, and I wish it understood that the hereinbefore specifically described embodiment is by way of illustration only and that all changes and modifications are contemplated that come within the scope of the claims appended hereto and where the term "fractional plate" is employed, in the claims, I wish the same understood as including fractional screens, color filters and/or negatives, unless otherwise specifically limited by the claims.

I claim as my invention:

1. The combination of a screen for fractional exposure of a sensitized surface, which screen has its area composed of transparent units and opaque units arranged in such an order that by adjusting the screen from one position to another with a right line movement in two directions from a given point a transparent unit and an opaque unit are caused to exchange positions, a holder on which said screen is mounted; and means for effecting movement of said screen in said two directions relative to said holder.

2. The combination of a screen for fractional exposure of a sensitized surface, which screen has its area composed of geometrical transparent and opaque units arranged in such an order that by adjusting the screen from one position to another with a right line movement in two directions from a given point a transparent and an opaque unit are caused to exchange positions, and a holder in which said screen is adjustable.

3. A holder for making photographic fractional exposures comprising: a base frame having an opening for the passage of light therethrough; a holding frame proper having a similar opening; and means for effecting adjustment of said holding frame proper, relative to the base frame, in two rectilinear directions at an angle to each other, said means including a slide groove cam and cooperable projection.

4. A holder for making photographic fractional exposures comprising: a base frame; a holding frame proper; and means for effecting adjustment of said holding frame proper, relative to the base frame, in two rectilinear directions at an angle to each other said frames being superimposed one on the other, said means including an operating element and an associated element automatically cooperable to interlock at predetermined points.

5. A holder for making photographic fractional exposures comprising: a holding frame proper; an intermediate frame; a base frame; and a slidable cam and cooperable projection between the holding and intermediate frames and between the intermediate and base frames each of said frames having an opening for the passage of light therethrough.

6. A holder for making photographic fractional exposures comprising: a holding frame proper; an intermediate frame; a base frame, the first two frames being relatively movable in one direction and the last two frames being relatively movable in a different direction, all movements being in parallel planes and the frames being superimposed one on the other; and means for automatically predetermining definite amounts of relative adjustment between the respective pairs of frames.

7. In a device of the character described, the combination with a fractional plate; of a holder for said plate; means for retaining said plate on said holder in predetermined adjusted position with respect thereto and with the exposed surface of the plate in a plane above any portion of said holder, whereby to permit contact of said plate during an exposure; a supporting frame; and means for adjusting said first named frame with respect to the supporting frame in a plane parallel to the surface of said plate holder.

8. In a device of the character described, the combination with a fractional plate; of a holder on which said plate is adapted to be mounted; means for securing said plate on said holder in predetermined position, said holder having an opening for the passage of light therethrough; a main frame; an intermediate frame between the first named and main frames, said main and intermediate frames having also openings therein for the passage of light therethrough; and means for adjusting the first named frame relative to the intermediate frame predetermined amounts in one direction, and the intermediate frame relative to the base frame predetermined amounts in a direction at right angles to said first named direction.

9. In a device of the character described, the combination with a fractional screen having series of opaque and transparent areas, the areas of one of said series being separated and of such spacing and form that, when shifted in predetermined directions and amounts in a plane parallel to the surface of the screen, the opaque and transparent areas exchange positions, whereby the entire area of a sensitized surface may be exposed in successive series of different areas; a screen frame on which said screen is mounted in a predetermined position; a main frame on which the screen frame is superposed; and means for effecting adjustment of said first named frame relative to the main frame in accordance with said predetermined directions and in predetermined amounts, each of said frames having a central opening therein for the passage of light therethrough to the screen and through the latter to a sensitized surface.

In witness that I claim the foregoing I have hereunto subscribed my name this 23rd day of May, 1928.

WILLIAM C. HUEBNER.